H. HOWARD.
LIQUID FLOW INDICATOR.
APPLICATION FILED FEB. 1, 1909.

1,049,718.

Patented Jan. 7, 1913.

Witnesses:
C. H. Potter.
N. P. Leonard.

Inventor:
Henry Howard
Byrnes, Townsend & Beckerstein,
Att'ys.

UNITED STATES PATENT OFFICE.

HENRY HOWARD, OF BOSTON, MASSACHUSETTS.

LIQUID-FLOW INDICATOR.

1,049,718.  Specification of Letters Patent.  Patented Jan. 7, 1913.

Application filed February 1, 1909. Serial No. 475,516.

*To all whom it may concern:*

Be it known that I, HENRY HOWARD, a citizen of the United States, residing at Boston, in the county of Suffolk and State of Massachusetts, have invented certain new and useful Improvements in Liquid-Flow Indicators, of which the following is a specification.

The object of this invention is the provision of a simple, reliable and inexpensive device for visually indicating the flow of liquids.

Figure 1:
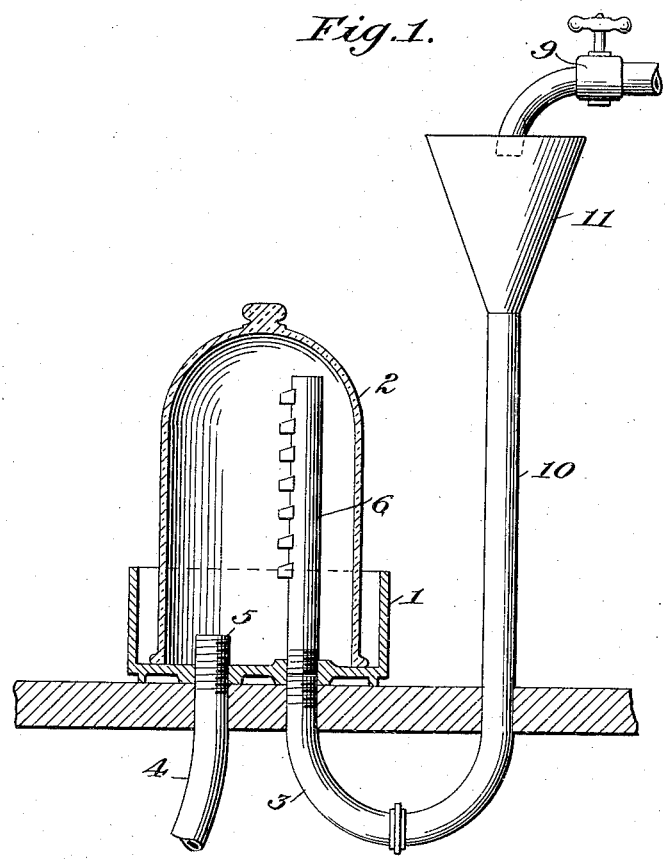
Figure 2:
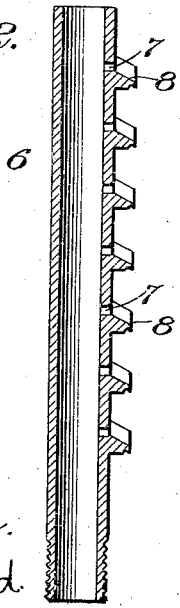
Figure 3:
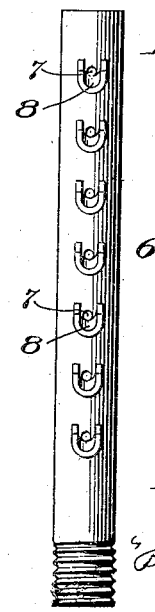

It is often desirable to provide means permanently connected in a liquid conduit or circulating system for indicating or measuring the rate of flow of liquid therein and for adjusting such flow with accuracy to a desired or predetermined standard. This I accomplish by means of the apparatus shown in the accompanying drawing wherein:

Figure 1 is a central vertical section of a preferred form of apparatus; Fig. 2 is a vertical sectional view of the standard on an enlarged scale; and Fig. 3 is an elevation of the standard viewed from the discharge side.

Referring to the accompanying drawing, 1 represents a cup-shaped base or liquid-receptacle which may be of cast iron or of such metal or material as may be required to withstand the action of any particular liquid. A glass bell-jar 2 stands within this receptacle and rises above the upper edge thereof. An inflow pipe 3 and an outflow pipe 4 for liquid communicate with the interior of the receptacle 1 through its bottom. The outflow pipe 4 may project upwardly into the receptacle as shown at 5; this arrangement is particularly useful when the liquid is volatile or is accompanied by gases, as a liquid seal is thereby provided to prevent the escape of gas around the bottom of the bell-jar.

A standard 6 extends upwardly within the bell-jar in communication with the inflow pipe 3. As shown in Figs. 2 and 3 this standard comprises a pipe, which may be open at its upper end, and is provided with a series of lateral discharge orifices 7, uniformly spaced. Preferably suitable lips 8 are arranged in connection with the several discharge orifices as shown in order that the flow from each may be clearly seen. This standard will of course be constructed of a material unacted upon by the liquid flowing through it.

This indicating device may be connected in any liquid conduit, and serves as a ready means for indicating the flow of liquid therethrough, it being necessary merely to note the number of discharge orifices through which liquid flows. Suitable valves or other controlling devices are provided in the liquid conduit, the operator being thereby enabled to establish a flow through one or any desired number of the orifices 7 as may be desired. The rate of flow through one, two, etc., orifices may be measured, and recorded if desired in a tabular statement attached to the device, which then becomes a measuring instrument for the particular liquid in question or one having similar physical properties. In case the flow of liquid is substantially constant the indicating device may be directly connected in the system and the flow therethrough controlled in any manner. Any desired means for equalizing an intermittent or irregular flow may of course be employed. Thus in Fig. 1 I have illustrated the inflow pipe 3 as connected with a leg 10 extending upwardly outside the bell-jar above the top of the standard 6, this leg terminating in a funnel 11 for receiving the liquid from the cock 9.

I claim:

1. A liquid-flow indicator comprising a liquid receptacle, inflow and outflow conduits communicating therewith, a fixed standard extending upwardly from the inflow conduit, said standard having a plurality of lateral discharge orifices for the liquid disposed at different levels and an outflow conduit below said discharge orifices.

2. A liquid-flow indicator comprising an open-topped receptacle for liquid, inflow and outflow conduits communicating therewith, a standard connected with the inflow conduit, said standard provided with a plurality of lateral discharge orifices for the liquid disposed at different levels, and a transparent casing inclosing said standard and outflow.

3. A liquid-flow indicator comprising an open-topped receptacle for liquid, inflow and outflow conduits communicating therewith, a standard connected with the inflow conduit, said standard provided with a plurality of lateral discharge orifices for the liquid disposed at different levels, and a transparent, open-bottomed casing in said receptacle and inclosing said standard and outflow.

4. A liquid-flow indicator comprising an open-topped liquid receptacle, inflow and outflow conduits communicating with the bottom thereof, said outflow conduit extending upwardly above said bottom, a standard connected with the inflow conduit and having a plurality of lateral discharge orifices for the liquid disposed at different levels, and a transparent open-bottomed casing in said receptacle and inclosing said standard and outflow.

In testimony whereof I affix my signature in presence of two witnesses.

HENRY HOWARD.

Witnesses:
 OSBORNE ISAIAH BEZANSON,
 EVERETT EDWIN BRAINARD.